United States Patent
Washio

[19]
[11] Patent Number: 6,147,771
[45] Date of Patent: Nov. 14, 2000

[54] METHOD OF IMAGE DENSITY ADJUSTMENT AND APPARATUS USING THE METHOD

[75] Inventor: Koji Washio, Hachioji, Japan

[73] Assignee: Konica Corporation, Tokyo, Japan

[21] Appl. No.: 09/063,695

[22] Filed: Apr. 21, 1998

[30] Foreign Application Priority Data

Apr. 24, 1997 [JP] Japan .................................. 9-107256

[51] Int. Cl.[7] .................................................. H04N 1/405
[52] U.S. Cl. ........................ 358/1.9; 358/455; 358/456; 358/457
[58] Field of Search .................................. 382/252, 270, 382/272, 274, 237; 358/456, 1.9, 465, 457, 458, 463, 448, 455, 298

[56] References Cited

U.S. PATENT DOCUMENTS 5,305,116  4/1994  Kagami .................................. 358/448
5,461,462  10/1995  Nakane et al. ......................... 355/208
5,519,509  5/1996  Hikosaka et al. ....................... 382/252

FOREIGN PATENT DOCUMENTS 63-234672  9/1988  Japan .
63-290072  11/1988  Japan .

*Primary Examiner*—Scott Rogers
*Attorney, Agent, or Firm*—Frishauf, Holtz, Goodman, Langer & Chick, P.C.

[57] ABSTRACT

An image density adjusting apparatus in which density of an image signal is adjusted, which performs: a first converting operation for converting an image signal having n-bit into a signal having m-bit larger than n-bit so as to change the number of gray-level; a gradation gamma converting operation for converting the signal having m-bit into a signal having t-bit larger than m-bit so as to change a gradation gamma; and a second converting operation for converting the signal having t-bit into a signal having s-bit smaller than t-bit so as to change the number of gray-level.

4 Claims, 3 Drawing Sheets

FIG. 2
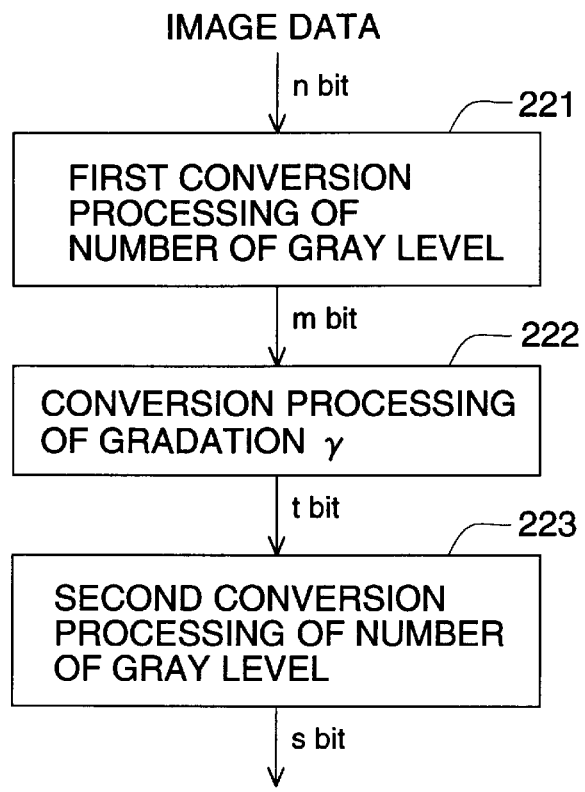
FIG. 3 (a)
FIG. 3 (b)
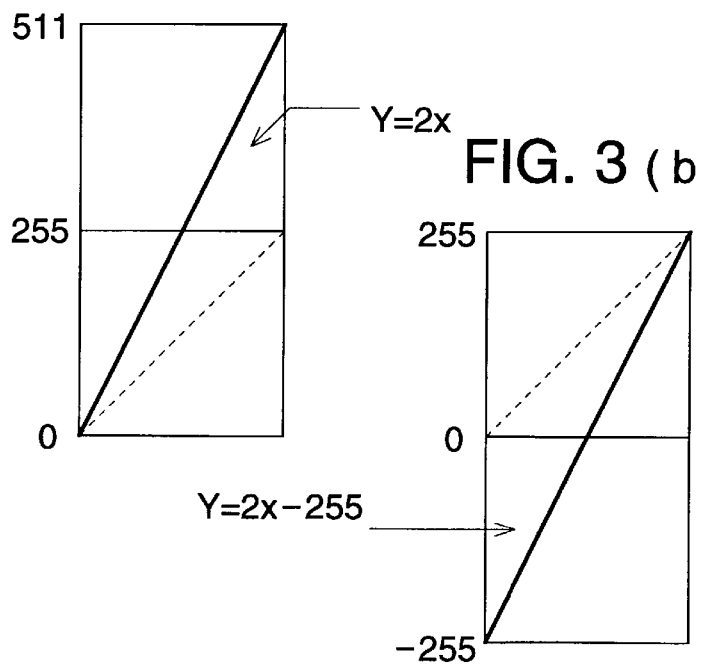

FIG. 4
| TARGET PIXEL | 1/2 |
|---|---|
| 1/2 | |
FIG. 5 (a)
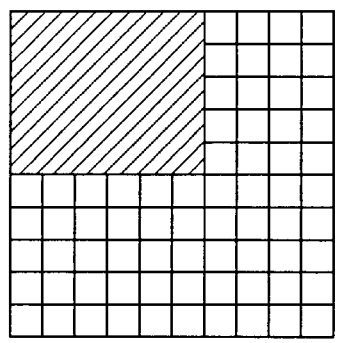
FIG. 5 (b)
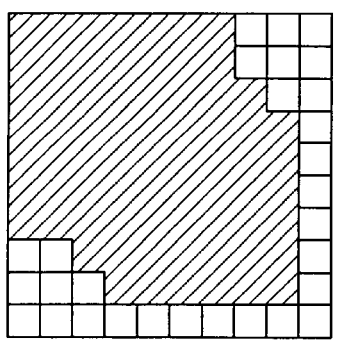
FIG. 5 (c)
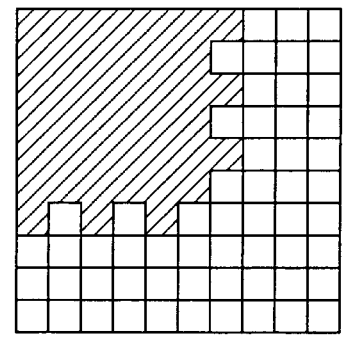

METHOD OF IMAGE DENSITY ADJUSTMENT AND APPARATUS USING THE METHOD

BACKGROUND OF THE INVENTION

The present invention relates to a method of image density adjustment which can change the tone of a halftoned image by a dither method or an error diffusion method employed in an image processing apparatus such as a personal computer, a scanner, a printer, a facsimile telegraph and a digital copier, without deteriorating resolution of the image, and to an apparatus using the method of image density adjustment.

In an the image processing apparatus such as a personal computer, a scanner, a printer, a facsimile telegraph and a digital copier, halftone images by a dither method or an error diffusion method are widely used. These methods can keep satisfactory gradation and resolution of an image while they reduce data sizes of the image.

However, binary halftone images represent a congregation of on/off data and they are difficult to be changed freely in terms of tone ($\gamma$) as they are. In this respect, they are different from multi-level images. Solution of this technical problem requires processing wherein an original multi-level image is estimated from a binary halftone image, tone ($\gamma$) of the estimated multi-level image is changed, and a dither method or an error diffusion method is used again for halftoning. Each of TOKKAISHO Nos. 63-234672 and 63-290072 discloses a technology to estimate an original multi-level image from a binary halftone image, In this technology, an N×N sized window is provided of which a target pixel is in the center, and the number of black pixels counted in that window is weighted to estimate a value of the target pixel.

However, in the method disclosed in the publications of TOKKAISHO Nos. 63-234672 and 63-290072, there is a possibility of deterioration of resolution because information of plural pixels are averaged. For example, fine lines having a width which is the same as that of a pixel turn into thick and light lines, or small letters turn into blurred letters which are not legible. When the multi-level image thus estimated is multiplied by $\gamma$ to be changed in terms of tone, and then is binary halftoned again, there is a possibility that fine lines and image quality reproduced on a binary image are deteriorated.

In view of the technical problems stated above, an object of the invention is to provide a method of image density adjustment and an apparatus using the same, which can change the tone of an image which is halftoned to a binary-level or multi-level by a dither method or an error diffusion method, without deteriorating resolution of the image.

The object mentioned above can be attained by either one of the following structure.

A method of image density adjustment wherein n-bit image signals are inputted, a first gray-level number converting processing is conducted to change image signals of n-bit to those of m-bit that is greater than n-bit, and to change image signals of m-bit to those of t-bit that is greater than m-bit, and a the second gray-level number converting processing is conducted to change the image signals of t-bit to those of s-bit that is smaller than t-bit.

The methods mentioned above can control, without deteriorating resolution and gradation, $\gamma$ (brightness) of the image which is halftoned to binary-level or multi-level by an error diffusion method, a dither method or a density pattern method so that gradation may be represented with plural pixels.

BRIEF DESCRIPTION OF THE DRAWINGS

FIG. 2 is a conceptual diagram showing processing procedures of density adjustment processing section 220.

Figure 1:
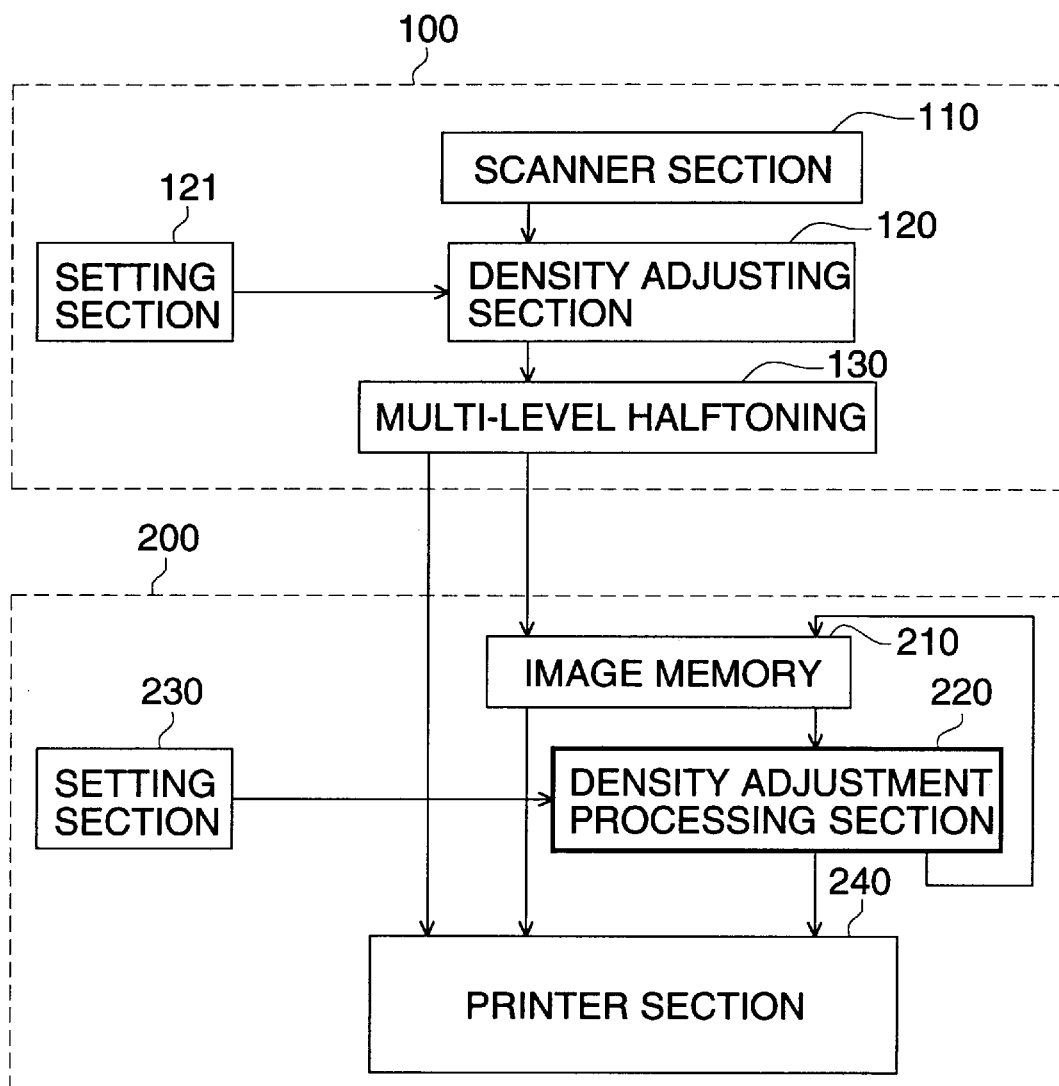
FIG. 1 is a block diagram showing an example of an image processing apparatus capable of reproducing variable density images realistically.

Each of FIGS. 3(*a*) and 3(*b*) is a graph showing a density conversion curve in tone $\gamma$ conversion processing wherein extension processing is applied in the embodiment wherein.

FIG. 4 is a conceptual diagram showing diffusion matrix in the embodiment.

Each of FIGS. 5(*a*)–5(*c*) is an illustrative diagram showing error avalanche caused by error diffusion.

DETAILED DESCRIPTION OF THE PREFERRED EMBODIMENT

A method of image density adjustment according to the present invention and a schematic structure of an image processing apparatus on which a density adjusting unit can be mounted will be explained with reference to FIG. 1.

FIG. 1 is a block diagram showing an example of an image processing apparatus capable of reproducing variable density images realistically.

An image forming apparatus shown in FIG. 1 is one capable of processing images which are multi-level halftoned by a dither method or an error diffusion method, and is one associated with a digital copying machine comprising composed scanner unit 100 and image processing apparatus 200. Without being limited to this, the method of image density adjustment of the invention can similarly be applied even to one wherein scanner unit 100 and image processing apparatus 200 are connected with telephone lines like a compound machine with a personal computer, a scanner, a printer or a facsimile telegraph, if images multi-level halftoned by a dither method or an error diffusion method can be processed.

The scanner unit 100 is one by which the image signals obtained through scanning of a document are multi-level halftoned and transmitted, and it is comprises scanner section 110, density adjusting section 120 and multi-level halftoning processing section 130, to correspond a personal computer, a scanner or a facsimile telegraph. The scanner 110 photoelectrically transfers optical images read optically from a document to obtain 10-bit luminance signals, and converts the luminance signals into 10-bit density signals to output the density signals. The density adjusting section 120 is one by which the inputted 10-bit density signals are subjected to $\gamma$ adjustment to turn into 8-bit density signals, and it is one wherein a look-up table corresponding to plural density conversion curves is written in a ROM or a RAM, and it further is one which is to obtain density signals wherein selected density curves have been $\gamma$-adjusted. The setting section 121 is one to select some density curves from a look-up table in the density adjusting section 120. The multi-level halftoning processing section 130 is one with which 8-bit density signals outputted from the density adjusting section 120 are subjected to multi-level halftoning processing conducted by an error diffusion method, a dither method or a density pattern method.

The image processing apparatus 200 is one which either reproduces multi-level images on a recording sheet from multi-level halftoned image signals, or stores in image memory 210, and it comprises image memory 210, density adjustment processing section 220, setting section 230 and printer section 240. To be concrete, it corresponds to a compound machine with a personal computer, a printer or a facsimile telegraph. The image memory 210 is one having a capacity which is enough to store compressed data for at least one page. Since image data stored in the image memory 210 are compressed for the purpose of saving storage capacity, it is not possible to adjust density easily with γ conversion processing. The density adjustment processing section 220 is one provided to control brightness freely without deteriorating resolution and gradation by doing γ conversion for the images which are multi-level halftoned, for representing gradation with plural pixels, by an error diffusion method, a dither method, or a density pattern method each corresponding to compressed image data for representing gradation with plural pixels. Image data after density adjustment outputted from the density adjustment processing section 220 are transmitted to the image memory 210 or to the printer section 240. Setting section 230 is one for setting parameters of adjustment of the density adjustment processing section 220. The printer section 240 is one for reproducing multi-level images by means of, for example, an electrophotographic method or an ink-jet method.

FIG. 2 is a conceptual diagram showing processing procedures of the density adjustment processing section 220.

In the processing procedures of the density adjustment processing section 220, first gray-level number conversion processing 221, gradation γ conversion processing 222 and second gray-level number conversion processing 223 are conducted in this order as shown in FIG. 2. Now, there will be given an explanation of the density adjustment processing for image data accumulated in the image memory 210 after being subjected to binary halftoning processing by an error diffusion method and being compressed to 1-bit images.

The density adjustment processing section 220 is one for applying the first gray-level number conversion processing 221 on n-bit image data read from the image memory 210 and thereby for extending them to m-bit image data, and it is materialized as a numeric operation shown in the following expression (1) or a one-dimensional look-up table such as a ROM and a RAM.

In the case of the first gray-level number conversion processing 221, there are some occasions wherein it is effective to use not only information x of a target pixel but also information of neighbor pixels. In the present embodiment, however, an example wherein image data x of a target pixel only are used will be explained. In this case, contents of concrete processing of the first gray level number conversion processing 221 are shown in the following expression (1).

$$y = x \cdot (2^m - 1)/(2^n - 1) \quad (1)$$

In the expression (1), y represents image data after conversion, x represents image data which are to be inputted. The symbol n represents a bit number of image data after conversion. Since 1-bit image data x are converted into 8-bit image data in this case, the expression turns into $y = x \cdot (2^8 - 1)$. A value of image data y after conversion is 0 (white) or 255 (black).

The density adjustment processing section 220 conducts gradation γ conversion processing 222 for image data y obtained by the first gray-level number conversion processing 221 shown in the expression (1), and is materialized as a numeric operation shown in expression (2) stated later or a one-dimensional look-up table such as a ROM and a RAM. Any expression can be used as a conversion expression used in the gradation γ conversion processing 222 provided that the input-output relation is on a one-to-one correspondence basis. To make the explanation simple, expression (2) wherein x represents input signals and y represents output is shown.

$$y = ax + b \quad (2)$$

In the above expression, coefficient a and coefficient b represent a real number, and a takes a value within a range −2.0 to 2.0 and b takes a value within a range −256 to 255, for example. Therefore, with regard to the range of output value y in the expression (2), clipping processing is conducted in the state of bit extension to 10-bit (−512 to 511), for example. To be concrete, coefficients a and b are changed by pressing an adjustment button of the setting section 230, which makes it possible to adjust an inclination of a density conversion curve and a level of density. The symbol x is to be substituted by 8-bit image data after conversion in the expression (1), and image data y after conversion in the expression (2) are of 10-bit which is greater than the bit number 8 of the image data inputted taking clipping processing into consideration.

Each of FIGS. 3(a) and 3(b) is a graph showing density conversion curve wherein bit extension processing in gradation γ conversion processing in the present embodiment is applied.

Dotted lines shown in FIGS. 3(a) and 3(b) represent the same density conversion curve which is a density conversion curve before inclination a and density level b are changed from the setting section 230, which is represented by y=x. FIG. 3(a) is one wherein a density change curve obtained by setting a and b respectively to 2.0 and 0 from the setting section 230 is shown with a solid line, in which y=2x. A density conversion curve whose density level is not lower than 127.5 in the density conversion curve shown with a dotted line overflows when exceeding 255 due to a which is set to 2.0. In this case, if data representing the density conversion curve shown with a solid line in FIG. 3(a) remain the same to be of 8-bit, density levels of 255 and higher are all changed to the level of 255. Hereafter, this is called a clip in the present embodiment. This means that gradation correction is made on and below the intermediate density level of 127.5 on the density conversion curve shown with a dotted line in FIG. 3(a), but gradation conversion processing is not conducted on and over the intermediate density level of 127.5. To prevent clipping caused on and over the intermediate density level of 127.5 on the half way of gradation γ conversion processing, the bit number of the image data after conversion shown in the expression (2) is extended to 10-bit which is greater than the bit number of image data x to be inputted. Due to this, data representing a density conversion curve shown with a solid line in FIG. 3(a) can all be indicated.

A solid line in FIG. 3(b) shows a density change curve wherein a is set to 2.0 from the setting section 230 and b is set to −255, which represents y=2x−255. To prevent clipping caused on and below the intermediate density level of 127.5 on the half way of gradation γ conversion processing, the bit number of the image data after conversion shown in the expression (2) is extended to 10-bit which is greater than the bit number of image data x to be inputted. Due to this, data representing a density conversion curve shown with a solid line in FIG. 3(b) can all be indicated.

For 10-bit (−512 to 511) representing image data extended in terms of bit through gradation γ conversion processing 222 the density adjustment processing section 220 conducts error diffusion processing with 8-bit which is a data length before bit extension by means of a diffusion matrix shown in FIG. 4, and conducts second gray-level number conversion processing 223 which conducts clipping for image data subjected to the error diffusion stated above. Second gray-level number conversion processing 233 is materialized by numeric operation such as an error diffusion method and a dither method. Error diffusion processing in the present embodiment will be explained as follows.

In the assumption, when x represents a target pixel value and er represents an error,
if x>128, dot ON, er=x−255
other than the above, dot OFF, er=x FIG. 4 is a conceptual diagram showing diffusion matrix in the present embodiment.

In the diffusion matrix shown in FIG. 4, a half of er is diffused on the right side of and right below a target pixel. Incidentally, the diffusion matrix is not limited to that shown in FIG. 4 but it includes any type provided that pattern noise does not appear.

The reason for clipping processing conducted for error-diffused image data in the present embodiment is that an error can not be diffused, and a phenomenon in which an image is painted like an avalanche can be caused, if the clipping processing is not conducted, because a bit is extended by gradation γ conversion processing 222 and thereby a range of image data is changed after the error diffusion processing. An avalanche of such error will be explained with reference to FIGS. 5(a), 5(b) and 5(c).

Each of FIGS. 5(a), 5(b) and 5(c) is an illustrative diagram showing an error avalanche caused by error diffusion.

FIG. 5(a) shows an image before error diffusion processing, and it is a black and white image on which a hatched square is shown at the upper portion on the left. When such black and white image is processed with 8-bit, density level for black pixel is 255, while that for white is 0, and the number of black pixels is 36.

When a black and white image shown in FIG. 5(a) is subjected to gradation conversion by the expression of y=2·x, density level of a black pixel is 510 and that of a white pixel remains the same to be 0. When such image data are subjected to ordinary error diffusion processing, clipping processing can not be conducted, and thereby errors are accumulated toward the right side and downward, increasing at a rapidly accelerating rate as shown in FIG. 5(b), thus an avalanche of errors is caused.

For easy understanding of such avalanche of errors, the error diffusion processing will be simplified in the following explanation. The error diffusion processing judges a black pixel having a value of 510 to be 255, and error=255 in this case is distributed to adjoining pixels on the right and on the below portion. Data of the black pixel bit-extended by the gradation γ conversion processing 222 contains latently an error of 255. Since the image shown in FIG. 5(a) contains 36 black pixels, the sum total of errors is 36×255. Namely, this value is enough to paint over 36 white pixels, and this moves downward obliquely to the right like an avalanche, painting white pixels to be black. This phenomenon takes place not only on the occasion of "white portion is painted to be black" but also on the occasion of "black is painted to be white". For example, it is represented by b<0 (for example, b=−255) in the expression of γ which is Y=ax+b. In this case, minus errors move like an avalanche on the portion where white pixels exist in succession, and they paint the adjoining portion where black pixels exist in succession to be white.

For the purpose of controlling this error avalanche, clipping processing is applied on adjoining pixels on the right side of a target pixel and on the portion below the target pixel with a range of clipping of 10-bit (−512 to 511), when executing the error diffusion processing. When this range of clipping is set to be greater than (−512 to 511), no effect to control the error avalanche is obtained, while when the range of clipping is set to be narrower than (−512 to 511), errors to be diffused are cut away carelessly, and thereby an effect of γ conversion (which means that density is changed) is deteriorated despite the γ conversion conducted in the preceding step.

FIG. 5(c) shows an image on which the second gradation number conversion processing is conducted by adding clipping processing to the error diffusion processing. Compared with the image in FIG. 5(a), the image shown in FIG. 5(c) shows that black pixels are protruded at most by one pixel, and the so-called error avalanche is considerably controlled.

When the density adjustment processing in the present embodiment is conducted, a binary image shown can be changed in terms of density without being deteriorated in terms of resolution due to the change in dot density (pattern).

The binary image thus obtained is either stored again in image memory 210 as image data, or supplied to printer section 240 to be outputted on a recording sheet.

In the density adjusting apparatus in the present embodiment, an image processed with halftoning to binary level or multi-level by the use of the error diffusion method, the dither method or the density pattern method mentioned above so that gradation may be represented by plural pixels can be controlled, not by the change of recording density of dots but by the change of density (pattern) of dots, in terms of γ (brightness) without being deteriorated in terms of resolution and gradation.

Incidentally, binary images are stated in the present embodiment, but the invention is not limited to this, and the same effect can be obtained in the same method even in the case of multi-level images.

Being provided with the aforesaid structures, the present invention makes it possible to change brightness of an image processed with binary-level halftoning or multi-level halftoning by the use of a dither method or an error diffusion method, without deteriorating its resolution.

What is claimed is:

1. A method of adjusting an image density comprising:

(a) inputting an n-bit image signal;

(b) converting the n-bit image signal into an m-bit image signal larger than the n-bit image signal by a first converting processing so as to change a gray-level number;

(c) converting the m-bit image signal into a t-bit image signal larger than the m-bit image signal by a gamma converting expression of a gradation gamma converting processing so as to change a gradation gamma; and (d) converting the t-bit image signal into an s-bit image signal smaller than the m-bit image signal by a second converting processing so as to again change the gray-level number;

wherein the second converting processing comprises an error diffusion processing operation in which an error obtained by comparing a value of a target pixel with a prescribed value is diffused to peripheral pixels of the target pixel to thereby correct values of the peripheral pixels, and each of the corrected values of the peripheral pixels is clipped so as not to exceed a predetermined value.

2. The method of claim 1, wherein in the first converting processing, an input signal for not less than one pixel and for pixels more than $2^{m-n}$ in number is used to obtain an output signal for one pixel.

3. An image density adjusting apparatus in which density of an image signal is adjusted, the apparatus comprising:
   (a) first converting means for converting an n-bit image signal into an m-bit image signal larger than the n-bit image signal so as to change a gray-level number;
   (b) gradation gamma converting means for converting the m-bit image signal into a t-bit image signal larger than the m-bit image signal so as to change a gradation gamma; and
   (c) second converting means for converting the t-bit image signal into an s-bit image signal smaller than the t-bit image signal so as to again change the gray-level number;

wherein the second converting means comprises means for performing an error diffusion processing operation in which an error obtained by comparing a value of a target pixel with a prescribed value is diffused to peripheral pixels of the target pixel to thereby correct values of the peripheral pixels, and each of the corrected values of the peripheral pixels is clipped so as not to exceed a predetermined value.

4. The image density adjusting apparatus of claim 3, wherein in the first converting means, an input signal for pixels less than $2^{m-n}$ in number is used to obtain an output signal for one pixel.

* * * * *